(12) United States Patent
Kunieda

(10) Patent No.: US 7,556,666 B2
(45) Date of Patent: Jul. 7, 2009

(54) HONEYCOMB STRUCTURE

(75) Inventor: Masafumi Kunieda, Gifu (JP)

(73) Assignee: Ibiden Co., Ltd., Ogaki-shi (JP)

( * ) Notice: Subject to any disclaimer, the term of this patent is extended or adjusted under 35 U.S.C. 154(b) by 528 days.

(21) Appl. No.: 11/278,782

(22) Filed: Apr. 5, 2006

(65) Prior Publication Data

US 2006/0230732 A1    Oct. 19, 2006

(30) Foreign Application Priority Data

Apr. 8, 2005    (JP) .................... P2005-112254

(51) Int. Cl.
*B01D 46/00* (2006.01)
*F01N 3/022* (2006.01)

(52) U.S. Cl. .............. 55/523; 55/282.3; 55/385.3; 55/482; 55/484; 55/524; 55/DIG. 5; 55/DIG. 10; 55/DIG. 30; 60/311; 422/180; 428/116; 264/628; 264/630; 264/631; 264/DIG. 48; 502/439; 95/273

(58) Field of Classification Search ........... 55/282.2, 55/282.3, 385.3, 482, 483, 484, 523, 524, 55/DIG. 5, DIG. 10, DIG. 30; 60/297, 299, 60/311; 422/177, 180; 428/116, 117, 118; 264/628, 630, 631, DIG. 48; 502/439; 95/273
See application file for complete search history.

(56) References Cited

U.S. PATENT DOCUMENTS

| 5,914,187 | A * | 6/1999 | Naruse et al. ............. 55/523 |
| 7,309,370 | B2 * | 12/2007 | Kudo et al. ............. 55/523 |
| 2002/0197193 | A1 * | 12/2002 | Harada et al. ............. 55/523 |
| 2006/0021310 | A1 | 2/2006 | Ohno et al. |
| 2006/0051556 | A1 | 3/2006 | Ohno et al. |
| 2007/0020155 | A1 | 1/2007 | Ohno et al. |
| 2007/0039295 | A1 * | 2/2007 | Ohno ............. 55/523 |
| 2007/0068128 | A1 | 3/2007 | Oshimi et al. |
| 2007/0128405 | A1 | 6/2007 | Sakaguchi et al. |
| 2007/0130897 | A1 | 6/2007 | Sakaguchi et al. |
| 2007/0160825 | A1 * | 7/2007 | Miyakawa et al. ....... 428/312.2 |
| 2007/0169453 | A1 | 7/2007 | Hayakawa |
| 2007/0178275 | A1 | 8/2007 | Takahashi |
| 2007/0196620 | A1 | 8/2007 | Ohno et al. |
| 2007/0212517 | A1 | 9/2007 | Ohno et al. |

(Continued)

FOREIGN PATENT DOCUMENTS

EP    1 419 816 A1    7/2002

(Continued)

OTHER PUBLICATIONS

U.S. Appl. No. 11/925,459.

(Continued)

*Primary Examiner*—Jason M Greene
(74) *Attorney, Agent, or Firm*—Foley & Lardner LLP

(57) ABSTRACT

A honeycomb structure including a plurality of porous ceramic members which are bonded through an adhesive layer, each of the porous ceramic members has a plurality of cells, which are arranged in parallel while being separated by cell walls. The cells extend in a longitudinal direction of the honeycomb structure. In the honeycomb structure, the following relationship is satisfied:

$$2 \leq B \leq 100/3 \times A - 10/3 \qquad (1)$$

where $A$ (g/cm$^3$) designates apparent density of the porous ceramic members, and $B$ (GPa) designates Young's modulus of the adhesive layer.

25 Claims, 5 Drawing Sheets

U.S. PATENT DOCUMENTS

| | | |
|---|---|---|
| 2007/0293392 A1 | 12/2007 | Ohno et al. |
| 2008/0083202 A1 | 4/2008 | Kunieda et al. |
| 2008/0138567 A1 | 6/2008 | Ninomiya et al. |
| 2008/0190081 A1 | 8/2008 | Oshimi |
| 2008/0190083 A1 | 8/2008 | Oshimi |
| 2008/0236122 A1 | 10/2008 | Ito |
| 2008/0241014 A1* | 10/2008 | Liu et al. .................... 422/180 |
| 2008/0241444 A1 | 10/2008 | Oshimi |

FOREIGN PATENT DOCUMENTS

| | | |
|---|---|---|
| EP | 1 247 556 A1 | 10/2002 |
| EP | 1 249 262 A1 | 10/2002 |
| JP | 2001-190916 | 7/2001 |

OTHER PUBLICATIONS

U.S. Appl. No. 11/932,469.

* cited by examiner

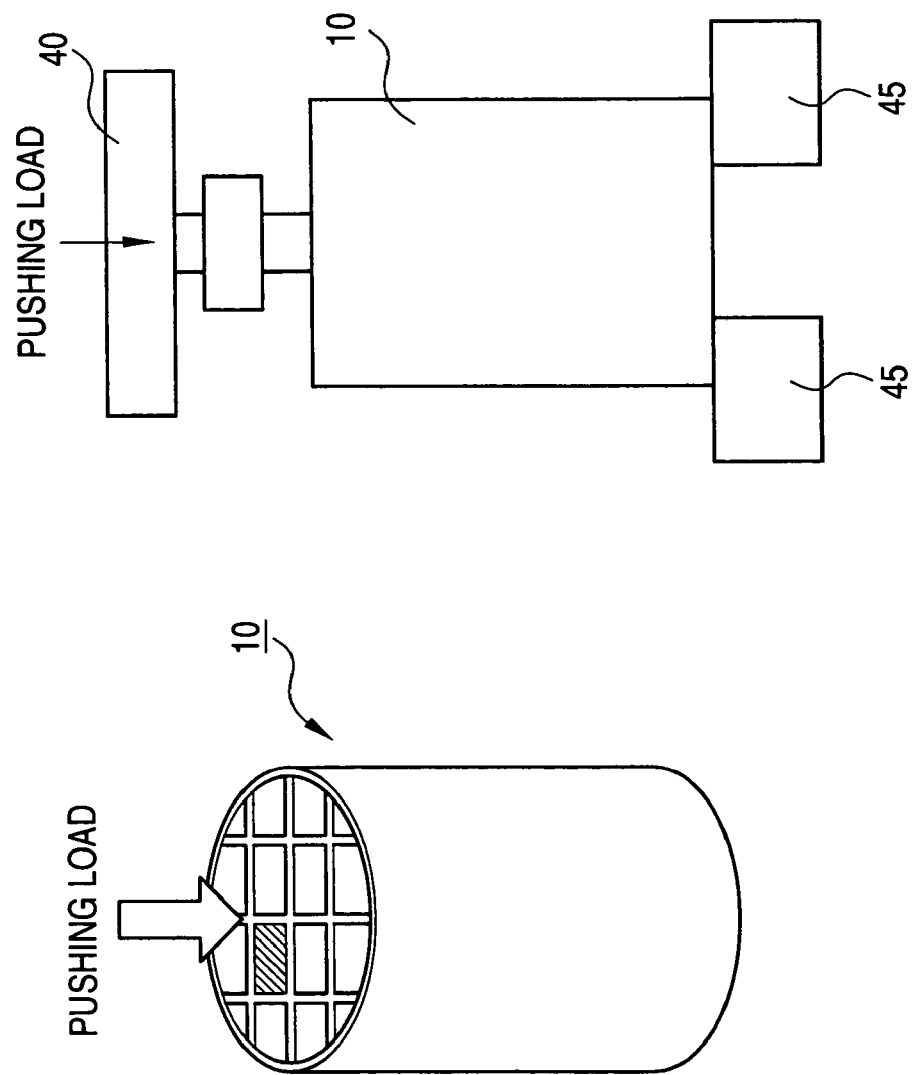

HONEYCOMB STRUCTURE

CROSS-REFERENCE TO RELATED PATENT APPLICATIONS

The right of priority under 35 U.S.C. §119(a) is claimed based on Japanese Patent Application No. 2005-112254, filed Apr. 8, 2005, the entire disclosure of which is hereby incorporated by reference.

BACKGROUND OF THE INVENTION

1. Field of the Invention

The present invention relates to a honeycomb structure which may serve, for example, as a filter for collecting and removing particulates etc. in exhaust gas discharged from an internal combustion engine such as, for example, a diesel engine.

2. Description of the Related Art

Recently, it has been a problem that particulates such as soot contained in exhaust gas discharged from internal combustion engines of vehicles such as, for example, engines in buses or trucks, construction machines, etc. are harmful to the environment or to human bodies.

Therefore, there have been proposed various filters using honeycomb structures made of porous ceramics for collecting particulates in exhaust gas and purifying the exhaust gas.

As such a honeycomb structure in the background art, for example, there has been disclosed a honeycomb structure comprised of two or more honeycomb segments and a bonding layer. The bonding layer is provided for bonding the honeycomb segments with each other. The Young's modulus of the bonding layer is not higher than 20% of the Young's modulus of the honeycomb segments, or the material strength of the bonding layer is lower than the material strength of the honeycomb segments (for example, see Patent Document 1 below).

It is described that such a honeycomb structure has durability because thermal stress generated in use is too small to generate no crack.

[Patent Document 1] JP 2001-190916 A

Generally, a filter serving to collect particulates in exhaust gas and convert the exhaust gas from gas components such as CO, HC, etc. by means of a catalyst is requested to have a high exhaust gas converting rate at a comparatively early stage after the start of an engine. To this end, it has been believed that the heat capacity of the honeycomb structure has to be reduced.

Means for providing a high porosity to the honeycomb structure and means for reducing the thickness of the cell walls of the honeycomb structure have been proposed as means for reducing the heat capacity of the honeycomb structure.

When the heat capacity of the honeycomb structure is reduced thus, there may appear a portion where the temperature is apt to rise or drop locally. As a result, thermal stress generated in the honeycomb structure may increase so that there a crack may occur in the honeycomb structure.

When the aforementioned means is used, the strength of the honeycomb structure may be lowered. This lowering of the strength also causes a crack in the honeycomb structure.

In the honeycomb structure disclosed in Patent Document 1, it is likely that the thermal stress can be relaxed by the bonding layer bonding the honeycomb segments with each other so as to prevent a crack from occurring. In the honeycomb structure in Patent Document 1, however, there is no consideration about the heat capacity of the honeycomb segments themselves. Thus, due to cell density, thickness of the cell walls, porosity, or the like in the honeycomb structure, the effect of preventing a failure such as a crack from occurring in the honeycomb structure may not be obtained sufficiently. For this sake, more and more improvement has been requested.

SUMMARY OF THE INVENTION

According to a preferred embodiment of the present invention, there has been provided a honeycomb structure, comprising a plurality of porous ceramic members; an adhesive layer bonding at least two porous ceramic members to each other; wherein each of the porous ceramic members comprises a plurality of cells; wherein the cells extend in a longitudinal direction along the length of the honeycomb structure, are arranged in parallel and are separated from one another by cell walls; and wherein the honeycomb structure satisfies the following relationship (1);

$$2 \leq B \leq 100/3 \times A - 10/3 \tag{1}$$

where $A$ (g/cm$^3$) designates apparent density of the porous ceramic members, and $B$ (GPa) designates Young's modulus of the adhesive layer.

According to yet another preferred embodiment of the present invention, there has been provided a filter comprising a honeycomb structure, such as, for example, the aforementioned honeycomb structure.

According to still another preferred embodiment of the present invention, there has been provided an exhaust gas system comprising a filter, such as, for example, the aforementioned filter.

According to still another preferred embodiment of the present invention, there has been provided a motor vehicle comprising a filter, such as, for example, the aforementioned filter.

According to still another preferred embodiment of the present invention, there has been provided construction equipment comprising a filter such as, for example the aforementioned filter.

According to still another preferred embodiment of the present invention, there has been provided a method of making a honeycomb structure, comprising forming a raw material paste comprising a binder, a dispersion medium, and a ceramic powder; mixing the raw material paste; extruding the raw material paste; molding the paste to form a molded ceramic body; drying the molded ceramic body to form a first porous ceramic member comprising a plurality of cells which each comprise cell walls; plugging an end portion of at least some cells with a plug paste; firing the first porous ceramic member; applying adhesive paste to at least a side surface of the first porous ceramic member and laminating at least a second porous ceramic member to the first porous ceramic member; heating the first porous ceramic member, the paste and the second fired porous ceramic dried body to produce the honeycomb structure.

The present inventor was intent on research to solve the foregoing problems. As a result, the present inventor newly discovered that a crack could be prevented in a honeycomb structure regardless of porosity or thickness of cell walls if a predetermined relationship was satisfied between the apparent density of porous ceramic members forming the honeycomb structure and the Young's modulus of an adhesive layer for bonding the porous ceramic members with each other. Thus, the inventor brought the invention to completion.

According to a an aspect of the present invention, there has been provided a honeycomb structure in which a plurality of porous ceramic members are bonded through an adhesive layer, each of the porous ceramic members has a plurality of cells, which are arranged in parallel while being separated by cell walls, and the cells extend in a longitudinal direction of the honeycomb structure, the honeycomb structure is characterized in that:

a relation expressed by an expression (1) is satisfied:

$$2 \leq B \leq 100/3 \times A - 10/3 \qquad (1)$$

where A (g/cm$^3$) designates apparent density of the porous ceramic members, and B (GPa) designates Young's modulus of the adhesive layer.

According to another aspect of the present invention, there has been provided a honeycomb structure wherein the apparent density A (of the porous ceramic members) is preferably in a range of about 0.4 to about 0.7 g/cm$^3$, and it is more preferably that the apparent density A is in a range of about 0.4 to about 0.6 g/cm$^3$.

It is also preferable, according to yet another aspect of the present invention, that a catalyst is carried and supported in at least a part of the cell walls.

According to still another aspect of the present invention, there has been provided a honeycomb structure wherein the apparent density A of the porous ceramic members and the Young's modulus B of the adhesive layer satisfy the relation of the aforementioned expression (1). Thus, the thermal stress generated in the honeycomb structure can be relaxed sufficiently by the adhesive layer, so that a failure such as a crack can be prevented from occurring in the honeycomb structure or the adhesive layer.

Particularly, when the honeycomb structure is intended to have high porosity or thinned cell walls, the heat capacity of the porous ceramic members is reduced so that the thermal stress is apt to increase. However, when the adhesive layer satisfying the relation of the aforementioned expression (1) is formed to bond the porous ceramic members with each other, a failure such as a crack can be prevented from occurring in the honeycomb structure or the adhesive layer. Thus, the honeycomb structure according to embodiments of the present invention is suitable, particularly, to solve the problems of honeycomb structures having high porosity and thinned cell walls. As a specific example of a problem, in the background art, honeycomb structures having high porosity and thinned cell walls had been regarded as easy to produce a failure such as a crack.

Further objects, features and advantages of the present invention will become apparent from the detailed description of preferred embodiments that follows, when considered together with the accompanying figures.

BRIEF DESCRIPTION OF THE DRAWINGS

FIGS. 3A and 3B are conceptual views schematically showing a method for measuring the pushing (punching) strength.

DETAILED DESCRIPTION OF PREFERRED EMBODIMENTS

A honeycomb structure according to a preferred embodiment of the present invention is one in which a plurality of porous ceramic members are bonded through an adhesive layer, each of the porous ceramic members has a plurality of cells, which are arranged in parallel while being separated by cell walls, and the cells extends in a longitudinal direction of the honeycomb structure, the honeycomb structure characterized in that:

a relation expressed by an expression (1) is satisfied:

$$2 \leq B \leq 100/3 \times A - 10/3 \qquad (1)$$

where A (g/cm$^3$) designates apparent density of the porous ceramic members, and B (GPa) designates Young's modulus of the adhesive layer.

In the honeycomb structure satisfying the aforementioned expression (1), that is, in the honeycomb structure in which the Young's modulus of the adhesive layer is made lower as the apparent density A of the porous ceramic members is lower (the heat capacity is lower), the thermal stress generated in the porous ceramic members can be relaxed so that a failure such as a crack can be prevented from occurring.

On the other hand, if the Young's modulus B (GPa) of the adhesive layer is lower than 2 GPa, the strength of the adhesive layer itself will be so insufficient so that a crack may occur in the adhesive layer or a failure of the honeycomb structure may begin at a portion of the adhesive layer.

If the Young's modulus B (SPa) of the adhesive layer exceeds the value of 100/3×A−10/3, the thermal stress generated in the porous ceramic members cannot be relaxed sufficiently by the adhesive layer. Thus, a crack may occur in the honeycomb structure (porous ceramic members).

Here, the value A (g/cm$^3$) designates the apparent density of the porous ceramic members. The value A can be calculated by the following expression (2):

$$\text{apparent density } A \text{ (g/cm}^3) = \text{true density (g/cm}^3) \times \qquad (2)$$
$$(100 - \text{porosity}(\%)) \times$$
$$(100 - \text{open area ratio}(\%)) \div$$
$$10000$$

Figure 2A:
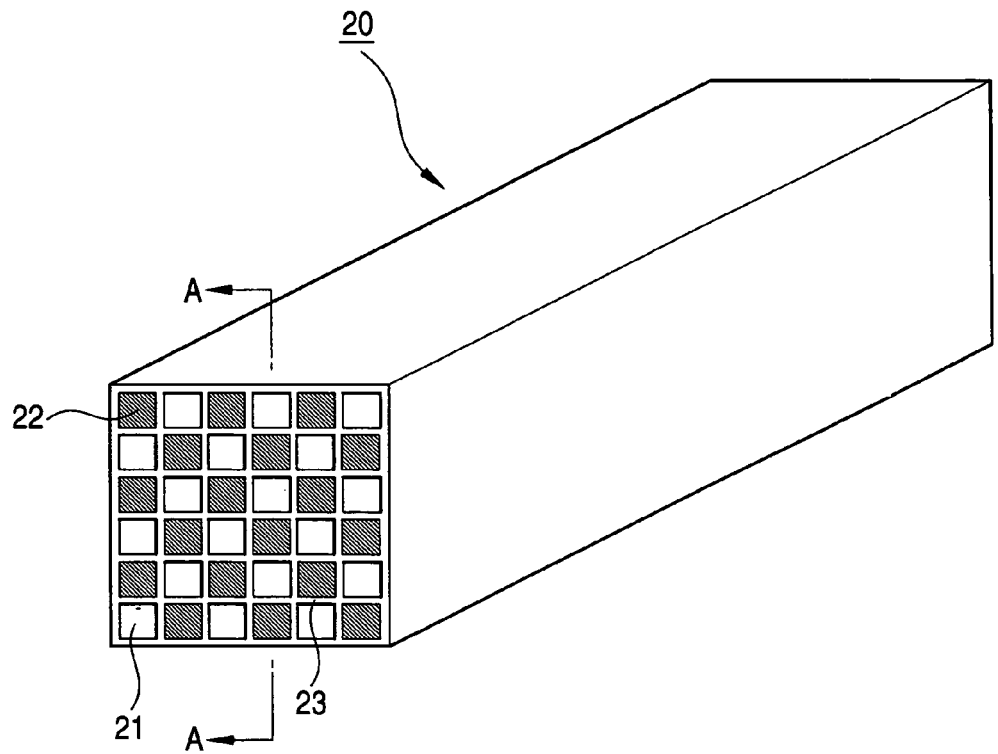
FIG. 2A is a perspective view schematically showing each porous ceramic member forming the honeycomb structure according to a preferred embodiment of the present invention.

The true density in this specification designates density of the material of the porous ceramic members, and the apparent density designates density calculated based on the volume occupied by the external appearance of the porous ceramic members (for example, the volume of the square pillar shape in FIG. 2A). If the honeycomb structure has high porosity or thin cell walls, the apparent density of the honeycomb structure will be reduced when the other conditions including the cell density are fixed.

In the aforementioned expression (1), it is preferred that the value (apparent density) A is in a range of about 0.4 to about 0.7 g/Cm$^3$. If the apparent density A is lower than about 0.4 g/cm$^3$, the strength of the porous ceramic members themselves will be so insufficient that the aforementioned effect of the invention cannot be enjoyed sufficiently. Thus, there may be a case that the honeycomb structure cannot serve as a filter. On the other hand, if the apparent density A exceeds about 0.7 g/cm$^3$, the heat capacity of the honeycomb structure using such porous ceramic members will be so large that the temperature rise characteristic may deteriorate. Thus, there may be disadvantages when the honeycomb structure is designed to carry and support a catalyst so as to serve as a DPF (diesel particulate filter).

It is more preferred that the value (apparent density) A is in a range of about 0.4 to about 0.6 g/cm³. When the apparent density A is in this range, the heat capacity of the honeycomb structure using the porous ceramic members is so small that the temperature rise characteristic is not lowered, but, instead, the effect becomes larger. In addition, the honeycomb structure can be made lighter in weight. Further, there may be advantages when the honeycomb structure is designed to carry and support a catalyst so as to serve as a DPF.

In the honeycomb structure according to a preferred embodiment of the present invention, a plurality of porous ceramic members in each of which a plurality cells are arranged in parallel while being separated by cell walls and extend in the longitudinal direction are bonded with each other through an adhesive layer. It is desired that each of the plurality of cells is sealed up in one of the end portions thereof.

Turning now to the figures, the honeycomb structure according to preferred embodiments of the present invention will be described below with reference to the drawings. Description will be made below on the honeycomb structure in which each of the plurality of cells is sealed up in one of the end portions thereof. However, in the honeycomb structure according to certain preferred embodiments of the present invention, the end portions of the plurality of cells do not always have to be sealed up.

Figure 1:
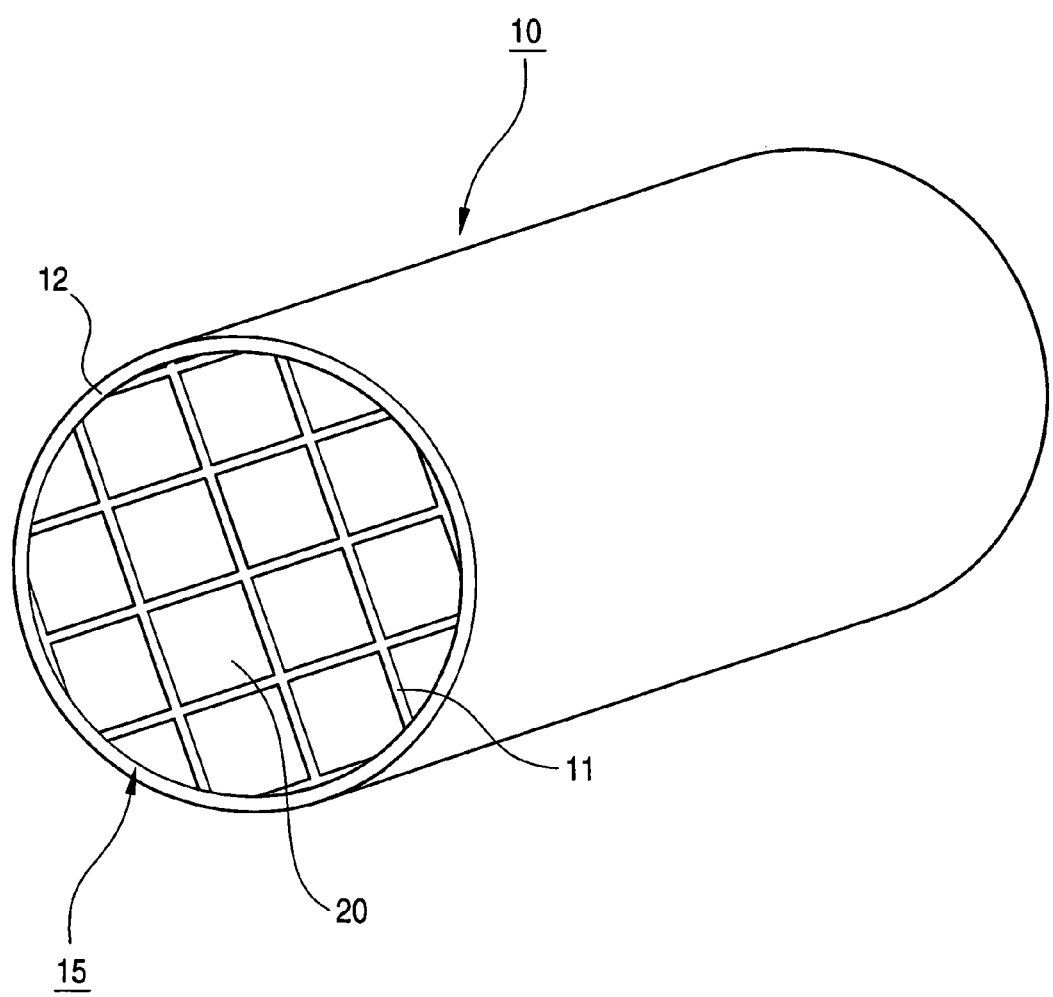
FIG. 1 is a perspective view schematically showing a honeycomb structure according to a preferred embodiment of the invention.

FIG. 1 is a perspective view schematically showing a honeycomb structure according to a preferred embodiment of the present invention. FIG. 2A is a perspective view of each porous ceramic member forming the honeycomb structure shown in FIG. 1. FIG. 23 is a sectional view of the porous ceramic member, taken on line A-A in FIG. 2A.

As shown in FIG. 1, in a honeycomb structure 10 according to a preferred embodiment of the present invention, a plurality of porous ceramic members 20 made of silicon carbide or the like are combined through an adhesive layer 11 so as to form a cylindrical ceramic block 15. A coating layer 12 is formed around the ceramic block 15.

In the honeycomb structure 10 shown in FIG. 1, the ceramic block has a cylindrical shape. However, in the honeycomb structure according to certain preferred embodiments of the present invention, the ceramic block is not limited to the cylindrical shape. The ceramic block may have any shape such as, for example, an elliptic columnar shape or a prismatic shape if it is pillar.

Figure 2B:
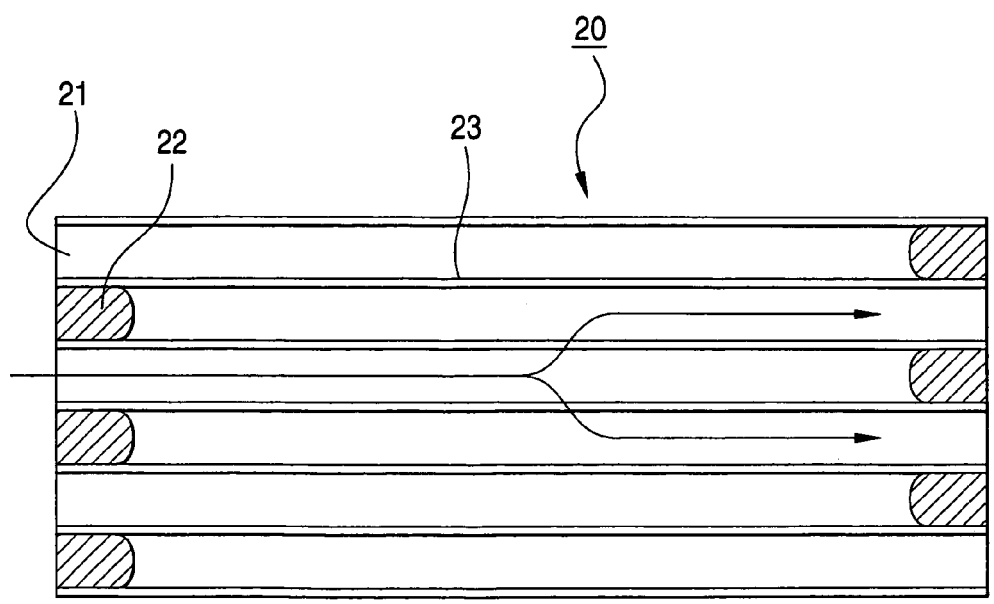
FIG. 2B is a sectional view taken on line A-A in FIG. 2A.

In each porous ceramic member 20, as shown in FIGS. 2A and 2B, a large number of cells 21 are arranged in parallel to extend in the longitudinal direction, and cell walls (wall portions) 23 separating the cells 21 from one another serve as a filter. That is, each cell 21 formed in the porous ceramic member 20 is sealed up with a plug 22 in its one end portion on the entrance side or the exit side of exhaust gas, as shown in FIG. 2B. The exhaust gas flowing into one cell 21 cannot fail to flow out from another cell 21 after passing through the cell wall 23 separating the cells 21 from each other.

The apparent density A of the porous ceramic members 20 and the Young's modulus B of the adhesive layer 11 satisfy the relation of the aforementioned expression (1). Accordingly, in the honeycomb structure 10, the thermal stress generated in the porous ceramic members 20 can be relaxed by the adhesive layer 11 so that a failure, such as a crack, can be prevented from occurring in the porous ceramic members.

The honeycomb structure 10 is chiefly made of porous ceramics. Examples of materials of the porous ceramics may include; nitride ceramics such as aluminum nitride, silicon nitride, boron nitride and titanium nitride; carbide ceramics such as silicon carbide, zirconium carbide, titanium carbide, tantalum carbide and tungsten carbide; oxide ceramics such as alumina, zirconia, cordierite, mullite, silica and aluminum titanate; etc. The honeycomb structure 10 may be formed out of two or more kinds of materials, such as, for example, a complex of silicon and silicon carbide. When a complex of silicon and silicon carbide is used, it is desired that silicon is added to reach about 5 to about 45 wt % of the total.

As for the material of the aforementioned porous ceramics, silicon carbide based ceramics having a high heat resistance, superior in mechanical characteristic and high thermal conductivity are preferred. The phrase "silicon carbide based ceramics" designates ceramics containing at least about 60 wt % of silicon carbide.

The average pore size of the honeycomb structure (porous ceramic members) is not limited especially. A preferable lower limit of the average pore size is about 1 μm, and a preferable upper limit thereof is about 100 μm. If the average pore size is smaller than about 1 μm, the loss in pressure will be high. In contrast, if the average pore size is larger than about 100 μm, particulates will pass the pores so that the particulates cannot be collected. Thus, the efficiency in collecting the particulates may deteriorate.

The porosity of the honeycomb structure (porous ceramic members) is not limited especially. A preferable lower limit of the porosity is about 20%, and a preferable upper limit thereof is about 80%. If the porosity is lower than about 20%, the pores of the honeycomb structure may be clogged easily. On the contrary, if the porosity is higher than about 80%, the strength of the honeycomb structure will be so low that the honeycomb structure may be broken easily.

The porosity can be measured by a method known in the background art, for example, by a mercury intrusion method, an Archimedean method, a method using a scanning electron microscope (SEM), or the like.

The open area ratio of the honeycomb structure (porous ceramic members) is not limited especially. A preferable lower limit of the open area ratio is about 50%, and a preferable upper limit thereof is about 80%. If the open area ratio is lower than about 50%, the loss in pressure may be high. On the contrary, if the open area ratio is higher than about 80%, the strength of the honeycomb structure may be low.

Each of the porosity and the open area ratio is one of the factors determining the apparent density A. Accordingly, it is preferable that the porosity and the open area ratio are selected suitably in consideration of the apparent density A of the porous ceramic members.

In the honeycomb structure (porous ceramic members) a preferable lower limit of the thickness of the cell walls is about 0.1 mm, and a preferable upper limit thereof is about 0.5 mm. A more preferable upper limit is about 0.35 mm.

If the thickness of the cell walls is smaller than about 0.1 mm, the strength of the honeycomb structure may be too low. On the contrary, if the thickness of the cell walls is larger than about 0.5 mm, the loss in pressure may be too large, and the heat capacity of the honeycomb structure may be so high that the exhaust gas cannot be converted immediately after the start of the engine when the honeycomb structure carries and supports a catalyst.

It is more desired that the plug 22 and the cell walls 23 forming each porous ceramic member 20 are made of one and the same porous ceramics, Consequently, the adhesion strength between the plug 22 and the cell walls 23 can be enhanced. In addition, when the porosity of the plug 22 is adjusted to be equal to that of the cell walls 23, the coefficient of thermal expansion of the plug 22 can be matched with that of the cell walls 23 so as to prevent a gap from being produced between the plug 22 and the cell walls 23 or a crack from being produced in the plug 22 or portions of the cell walls 23 abutting against the plug 22 due to thermal stress at the time of manufacturing or using the honeycomb structure. Incidentally, the cell walls designate both the cell walls separating the cells 21 from one another and the outer circumferential portion of each porous ceramic member 20.

The thickness of the plug 22 is not limited especially. For example, when the plug 22 is made of porous silicon carbide, a preferable lower limit is about 1 mm, and a preferable upper limit is about 20 mm. A more preferable lower limit is about 3 mm, and a more preferable upper limit is about 10 mm.

In the honeycomb structure 10 according to a preferred embodiment of the invention, the adhesive layer 11 has the aforementioned function of relaxing the thermal stress. In addition, the adhesive layer 11 is formed between the porous ceramic members 20 so as to serve as an adhesive for binding the plurality of porous ceramic members 20 with each other. In addition, the adhesive layer 11 also has a function of preventing the exhaust gas from leaking.

The material forming the adhesive layer 11 is not limited especially, but any material can be used if the Young's modulus of the material which has been solidified satisfies the aforementioned expression (1). For example, a material made of an inorganic binder, an organic binder and inorganic fibers and/or inorganic particles can be used.

Examples of the aforementioned inorganic binder may include silica sol, alumina sol, etc. Each of these inorganic binders may be used singly, or two or more of them may be used together. Of the inorganic binders, silica sol is preferred.

Examples of the aforementioned organic binder may include polyvinyl alcohol, methyl cellulose, ethyl cellulose, carboxymethyl cellulose, etc. Each of these organic binders may be used singly, or two or more of them may be used together. Of the organic binders, carboxymethyl cellulose is preferred.

Examples of the aforementioned inorganic fibers may include ceramic fibers, whiskers, etc. of silica-alumina, mullite, alumina, silica, aluminum borate whiskers, etc. Each of these inorganic fibers may be used singly, or two or more of them may be used together. Of the inorganic fibers, silica-alumina fibers are preferred.

Examples of the aforementioned inorganic particles may include carbides, nitrides, etc. Specifically, inorganic powder etc. made of silicon carbide, silicon nitride, boron nitride or the like can be used. Each of these inorganic particles may be used singly, or two or more of them may be used together. Of the inorganic particles, silicon carbide higher in thermal conductivity is preferred.

Further, a pore forming agent such as balloons which are hollow microspheres having oxide-based ceramics as their components, spherical acrylic particles, graphite, etc. may be added to paste for forming the adhesive layer as needed.

The balloons are not limited especially. Examples of the balloons may include alumina balloons, silica-alumina balloons, glass microballoons, Shirasu balloons, fly ash balloons (FA balloons), etc. Of these balloons, silica-alumina balloons are preferred.

The coating layer 12 is formed on the outer circumferential surface of the ceramic block 15. The coating layer 12 serves as a sealant for preventing the exhaust gas from leaking out from the outer circumferential surface of the ceramic block 15, and as a reinforcement for shaping or reinforcing the honeycomb structure when the honeycomb structure 10 is installed in an exhaust passageway in communication with an internal combustion engine.

A material similar to that for forming the adhesive layer 11 may be used as the material for forming the coating layer 12.

The adhesive layer 11 and the coating layer 12 may be made of one and the same material or may be made of different materials from each other. Further, when the adhesive layer 11 and the coating layer 12 are made of one and the same material, the material of the adhesive layer 11 and the material of the coating layer 12 may have one and the same compounding ratio or may have different compounding ratios from each other.

In the honeycomb structure according to a preferred embodiment of the present invention, the cells may be classified into two kinds of cells, that is, an entrance-side cell group and an exit-side cell group. Each cell belonging to the entrance-side cell group is sealed up in its exit-side end portion with a plug so that the total area of its section perpendicular to the longitudinal direction increases relatively to the end surface of the honeycomb structure as a whole. Each cell belonging to the exit-side cell group is sealed up in its entrance-side end portion with the plug so that the total area of its section perpendicular to the longitudinal direction decreases relatively.

Combinations of the entrance-side cell group and the exit-side cell group include (1) the case where the area of the perpendicular section of each cell forming the entrance-side cell group is equal to that of each cell forming the exit-side cell group, and the number of cells forming the entrance-side cell group is larger than the number of cells forming the exit-side cell group, (2) the case where the area of the perpendicular section of each cell forming the entrance-side cell group is different from that of each cell forming the exit-side cell group, and the number of cells forming the entrance-side cell group is also different from the number of cells forming the exit-side cell group, and (3) the case where the area of the perpendicular section of each cell forming the entrance-side cell group is larger than that of each cell forming the exit-side cell group, and the number of cells forming the entrance-side cell group is equal to the number of cells forming the exit-side cell group.

The cells forming the entrance-side cell group and/or the cells forming the exit-side cell group may be arranged out of one kind of cells being uniform in shape, perpendicular sectional area, etc., or may be arranged out of two or more kinds of cells being different in shape, perpendicular sectional area, etc.

A catalyst may be carried and supported by at least parts of the cell walls in the honeycomb structure according to certain preferred embodiments of the present invention.

When the honeycomb structure according to a preferred embodiment of the present invention has the cell walls carrying and supporting a catalyst capable of converting exhaust gas from harmful gas components such as CO, HC, NOx, etc., the exhaust gas can be converted sufficiently from the harmful gas components due to the catalytic reaction.

When a catalyst helping combustion of particulates is carried and supported, the particulates can be burnt and removed more easily. As a result, the honeycomb structure according to a preferred embodiment of the present invention can improve the performance to purify the exhaust gas, and can further reduce the energy for burning the particulates.

The catalyst is not limited especially. For example, the catalyst may be a catalyst made of noble metal such as platinum, palladium or rhodium. A compound to be carried and supported may include alkali metals (Group I of the periodic table of the elements), alkaline-earth metals (Group II of the periodic table of the elements), rare-earth elements (Group III of the periodic table of the elements), transition metal elements, etc. in addition to the noble metals.

The catalyst may be attached to the honeycomb structure after the surface of the honeycomb structure is coated with a catalyst support layer of alumina or the like in advance.

Examples of the catalyst support layer may include oxide ceramics such as alumina, titania, zirconia, silica, etc.

The honeycomb structure carrying and supporting the aforementioned catalyst serves as a gas purifier similar to a DPF (Diesel Particulate Filter) with a catalyst known in the background art. Therefore, detailed description about the case where the honeycomb structure according to certain preferred embodiments of the present invention also serves as a catalyst carrier will be omitted here.

Next, description will be made of a method for manufacturing the aforementioned honeycomb structure.

First, raw material paste having the aforementioned ceramics as its main component is extruded. Thus, square pillar-shaped ceramic molded bodies are produced.

The raw material paste is not limited especially. It is desired that the raw material paste can attain about 20 to about 80% of porosity in the honeycomb structure which has been manufactured. For example, the raw material paste can be obtained by adding a binder, dispersion medium liquid, etc. to powder made of the aforementioned ceramics.

The particle size of the ceramic powder is not limited especially. It is preferable that the ceramic powder has low contraction in a subsequent firing process. For example, it is preferable that 100 parts by weight of powder having an average particle size of about 0.3 to about 70 μm is combined with about 5 to about 65 parts by weight of powder having an average particle size of about 0.1 to about 1.0 μm.

The pore size etc. of the porous ceramic members can be adjusted by adjusting the firing temperature and the particle size of the ceramic powder.

The ceramic powder may be subjected to oxidation treatment in advance.

The binder is not limited especially. Examples of the binder may include methyl cellulose, carboxymethyl cellulose, hydroxyethyl cellulose, polyethylene glycol, phenolic resin, epoxy resin, etc.

Normally, it is desired that about 1-15 parts by weight of the binder is mixed to 100 parts by weight of the ceramic powder.

The dispersion medium liquid is not limited especially. Examples of the dispersion medium liquid may include an organic solvent such as benzene, alcohol such as methanol, water, etc.

A proper quantity of the dispersion medium liquid is mixed so that the viscosity of the raw material paste is within a predetermined range.

These ceramic powder, binder and dispersion medium liquid are mixed by ATTRITOR or the like, kneaded sufficiently by a kneader or the like, and then extruded.

A molding assistant may be added to the raw material paste as needed.

The molding assistant is not limited especially. Examples of the molding assistant may include ethylene glycol, dextrin, fatty acid, fatty acid soap, polyvinyl alcohol, etc.

Further, a pore forming agent such as balloons which are hollow microspheres having oxide-based ceramics as their components, spherical acrylic particles, graphite, etc. may be added to the raw material paste as needed. The balloons are not limited especially. Examples of the balloons may include alumina balloons, glass microballoons, Shirasu balloons, fly ash balloons (FA balloons), mullite balloons, etc. Of these balloons, alumina balloons are preferred.

Next, the ceramic molded body is dried, for example, by use of a microwave dryer, a hot air dryer, an oven, a dielectric dryer, a decompression dryer, a vacuum dryer, a freeze dryer, etc. so as to be formed into a ceramic dried body. Next, a predetermined amount of plug paste which will serve as a plug is charged into each exit-side end portion of the entrance-side cell group and each entrance-side end portion of the exit-side cell group. Thus, the cells are clogged and sealed up.

The plug paste is not limited especially. It is desired that the porosity of the plug produced in a subsequent process will be about 30 to about 75%. For example, paste similar to the aforementioned raw material paste can be used.

Next, the ceramic dried body plugged with the plug paste is degreased (for example, at about 200 to about 500° C.) and fired (for example, at about 1,400 to about 2,300° C.) in predetermined conditions. Thus, it is possible to manufacture a porous ceramic member 20 made of porous ceramics and formed into a single sinter as a whole.

The conditions used for manufacturing a filter made of porous ceramics in the background art can be applied to the conditions with which the ceramic dried body is degreased and fired.

Next, adhesive paste which will serve as the adhesive layer 11 is applied to the side surface of the porous ceramic member 20 so as to form an adhesive paste layer. Another porous ceramic member 20 is laminated onto the adhesive paste layer. This process is repeated to produce a porous ceramic member assembly having predetermined dimensions.

The material forming the adhesive paste has been already described in detail. Therefore, the description of the material will be omitted here. In selecting the material, consideration should be given to the apparent density of the porous ceramic members 20 and the Young's modulus of the adhesive layer to be formed.

Next, the porous ceramic member assembly is heated. Thus, the adhesive paste layer is dried and solidified to form the adhesive layer 11.

Next, the porous ceramic member assembly in which a plurality of porous ceramic members 20 have been bonded through the adhesive layer 11 is cut by a diamond cutter or the like so as to produce the cylindrical ceramic block 15.

The coating layer 12 is formed out of the aforementioned coating paste on the outer circumference of the ceramic block 15. Thus, it is possible to manufacture the honeycomb structure 10 in which the coating layer 12 is provided in the outer circumferential portion of the columnar ceramic block 15 having a plurality of porous ceramic members 20 bonded through the adhesive layer 11.

After that, a catalyst is carried and supported by the honeycomb structure (cell walls) as needed. The catalyst may be carried and supported on the porous ceramic members which have not yet been formed into an assembly.

When the catalyst is carried and supported, for example, an alumina coat (film) having a large specific surface area may be formed on the surfaces of the cell walls, and a promoter and the catalyst such as, for example, platinum may be provided on the surface of the alumina coat (film).

The honeycomb structure according to this exemplary embodiment is premised on that the apparent density A of the porous ceramic member 20 is measured before the catalyst support layer and/or the catalyst are applied to the honeycomb structure. Process of applying the catalyst support layer and/or the catalyst to a honeycomb structure changes the apparent density A of the porous ceramic member 20. Even if the honeycomb structure before the applying process satisfies, for example, the relationship (1), the resultant honeycomb structure may not satisfy the relationship (1). In this specification, for example, the expression "a honeycomb structure satisfies the relationship (1)" means that a honeycomb structure "before the process of applying the catalyst support layer and/or the catalyst" satisfies the relationship (1).

It is noted that the applied catalyst and the applied catalyst support layer can be removed with acid. Therefore, even if a honeycomb structure has a catalyst and/or a catalyst support layer, the apparent density A of the porous ceramic member 20 and the Young's modulus B of the adhesive layer 11 can be obtained after the catalyst and/or the catalyst support layer is removed.

EXAMPLES

Examples will be represented below for describing certain preferred embodiments of the present invention in more detail. However, the invention is not limited only to these examples.

1-1. Formation of Porous Ceramic Member A 5, 940 parts by weight of coarse powder of α-silicon carbide having an average particle size of 22 μm and 2,550 parts by weight of fine powder of α-silicon carbide having an average particle size of 0.5 μm were wet-mixed. Further, 700 parts by weight of organic binder (methyl cellulose), 280 parts by weight of acrylic hollow particles having a diameter of 40 μm, 330 parts by weight of plasticizer (Unilube made by NOF Corp.) 150 parts by weight of lubricant (glycerin) and a proper amount of water were added and kneaded to obtain a mixture composition.

After that, the mixture composition was extruded to produce a prismatic raw molded body shown in FIGS. 2A-2B.

Next, the raw molded body was dried by use of a microwave dryer or the like so as to be formed into a ceramic dried body. After that, predetermined cells were plugged with plug paste whose composition was similar to that of the raw molded body.

Next, the raw molded body was dried again by the dryer, then degreased at 400° C. and fired at 2,200° C. for three hours under an atmosphere of argon at normal pressure. Thus, a porous ceramic member A made of a silicon carbide sinter was manufactured. The porosity was 48%, the average pore size was 14 μm, the porous ceramic member A measured 34.3 mm by 34.3 mm by 150 mm, the number of cells 21 (cell density) was 54.3 cells/cm$^2$, the thickness of the cell walls 23 was 0.175 mm, the apparent density was 0.4 (g/cm$^3$) and the open area ratio was 75.9%.

1-2. Manufacture of Porous Ceramic Members B-F

Porous ceramic members B-F made of silicon carbide sinters having shapes shown in Table 1 were manufactured in the same manner as the aforementioned process 1-1, except that the loadings of the material powder etc. were changed as shown in Table 1.

(Unilube made by NOF Corp.), 150 parts by weight of lubricant (glycerin) and a proper amount of water were added and kneaded to obtain a mixture composition.

After that, the mixture composition was extruded to produce a prismatic raw molded body shown in FIGS. 2A-2B.

Next, the raw molded body was dried by use of a microwave dryer or the like so as to be formed into a ceramic dried body. After that, predetermined cells were plugged with plugging paste whose composition was similar to that of the raw molded body.

Next, the raw molded body was dried again by the dryer, then degreased at 400° C. and fired at 1,450° C. for 0.5 hours under an atmosphere of argon at normal pressure. Thus, a porous ceramic member G made of an Si—SiC sinter was manufactured. The porosity was 42%, the average pore size was 11 μm, the porous ceramic member G measured 34.3 mm by 34.3 mm by 150 mm, the number of cells 21 (cell density) was 46.5 cells/Cm$^2$, the thickness of the cell walls 23 was 0.2 mm, the apparent density was 0.44 (g/cm$^3$) and the open area ratio was 74.6%.

1-4. Manufacture of Porous Ceramic Member H

A porous ceramic member H made of an Si—SiC sinter having a shape shown in Table 1 was manufactured in the same manner as the aforementioned process 1-3, except that the loadings of the material powder etc. were changed as shown in Table 1.

TABLE 1

| Porous Ceramic Member | Ceramic Coarse Powder | | | Ceramic Fine Powder | | | MC Loadings (Parts by Weight) | Hollow Particles Loadings (Parts by Weight) | Sinter |
|---|---|---|---|---|---|---|---|---|---|
| | Material | Particle Size (μm) | Loadings (Parts by Weight) | Material | Particle Size (μm) | Loadings (Parts by Weight) | | | |
| A | SiC | 22 | 5940 | SiC | 0.5 | 2550 | 700 | 280 | SiC |
| B | SiC | 22 | 7000 | SiC | 0.5 | 3000 | 700 | — | SiC |
| C | SiC | 22 | 5130 | SiC | 0.5 | 2200 | 700 | 490 | SiC |
| D | SiC | 22 | 7000 | SiC | 0.5 | 3000 | 1100 | — | SiC |
| E | SiC | 22 | 5710 | SiC | 0.5 | 2450 | 700 | 340 | SiC |
| F | SiC | 22 | 7000 | SiC | 0.5 | 3000 | 700 | — | SiC |
| G | SiC | 40 | 8000 | Si | 5 | 2000 | 700 | — | Si/SiC |
| H | SiC | 40 | 8000 | Si | 5 | 2000 | 1100 | — | Si/SiC |

| Porous Ceramic Member | True Density (g/cm$^3$) | Thickness Of Cell Walls (mm) | Cell Density (cells/cm$^2$) | Open Area Ratio (%) | Porosity (%) | Pore Size (μm) | Apparent Density (g/cm$^3$) | Value Assigned to Right Side of Expression (1) |
|---|---|---|---|---|---|---|---|---|
| A | 3.2 | 0.175 | 54.3 | 75.9 | 48 | 14 | 0.40 | 10.0 |
| B | 3.2 | 0.2 | 46.5 | 74.6 | 42 | 11 | 0.47 | 12.4 |
| C | 3.2 | 0.3 | 46.5 | 63.3 | 55 | 18 | 0.53 | 14.3 |
| D | 3.2 | 0.25 | 46.5 | 68.8 | 45 | 11 | 0.55 | 15.0 |
| E | 3.2 | 0.3 | 46.5 | 63.3 | 50 | 14 | 0.59 | 16.3 |
| F | 3.2 | 0.4 | 26.4 | 63.2 | 42 | 11 | 0.68 | 19.5 |
| G | 3.0 | 0.2 | 46.5 | 74.6 | 42 | 11 | 0.44 | 11.4 |
| H | 3.0 | 0.25 | 46.5 | 68.8 | 45 | 11 | 0.51 | 13.8 |

MC: methyl cellulose
Hollow particles: acrylic hollow particles of diameter 40 μm
Particle size, pore size and porosity are average values in the table.
The value assigned to right side of Expression (1) designates a calculated value of 100/3 × (apparent density) − 10/3.

1-3 Manufacture of Porous Ceramic Member G 8,000 parts by weight of coarse powder of α-silicon carbide having an average particle size of 40 μm and 2,000 parts by weight of Si powder having an average particle size of 5 μm were wet-mixed. Further, 700 parts by weight of organic binder (methyl cellulose), 330 parts by weight of plasticizer 2-1 Preparation of Adhesive Pastes A-I Of silicon carbide powder having an average particle size of 0.5 μm, silica sol (SiO$_2$ content in sol: 30 wt %), silica-alumina fibers (3 μm in average fiber diameter and 60 μm in average fiber length), alumina fibers (5 μm in average fiber diameter and 60 μm in average fiber length), aluminum borate whiskers (0.5 μm in average fiber diameter and 20 μm in average fiber length), silica-alumina balloons (75 μm in average particle size), carboxymethyl cellulose and water, required components were mixed and kneaded to prepare adhesive pastes A-I. The loadings of the respective components are shown in Table 2. The loadings are expressed by parts by weight.

In the preparation of the adhesive pastes A-I, a required amount of water was added so that the viscosity of each adhesive paste was 40±5P.

TABLE 2

| Adhesive Paste | Sic Powder | Silica Sol | Silica-Alumina Fiber | Alumina Fiber | Aluminum Borate Whisker | Silica-Alumina Balloon | Carboxymethyl Cellulose | Water | Young's Modulus (GPa) |
|---|---|---|---|---|---|---|---|---|---|
| A | — | 5 | — | — | 95 | — | 0.5 | required amount | 1 |
| B | 20 | 5 | — | — | 75 | — | 0.5 | required amount | 2 |
| C | 30 | 7 | 63 | — | — | — | 0.5 | required amount | 5 |
| D | 40 | 10 | 50 | — | — | 5 | 0.5 | required amount | 10 |
| E | 50 | 10 | 40 | — | — | 10 | 0.5 | required amount | 12 |
| F | 55 | 12 | — | 33 | — | 20 | 0.5 | required amount | 14 |
| G | 60 | 15 | — | 25 | — | 30 | 0.5 | required amount | 16 |
| H | 65 | 15 | 20 | — | — | 50 | 0.5 | required amount | 19 |
| I | 75 | 15 | 10 | — | — | 70 | 0.5 | required amount | 20 |

The loadings in the table are expressed by parts by weight.

Further, Table 2 also shows the Young's modulus (GPa) of the adhesive pastes A-I which have been solidified.

Example 1

Using the adhesive paste B as an adhesive layer 2 mm thick, 16 (4 by 4) porous ceramic members A were bonded and successively cut by a diamond cutter. Thus, a cylindrical ceramic block 15 (see FIG. 1) was produced.

Next, the adhesive paste B was used as a coat forming paste and applied to the outer circumferential portion of the ceramic block 15 so as to be 0.5 mm thick, and then dried at 120° C. Thus, a cylindrical honeycomb structure 10 measuring 143.8 mm in diameter and 150 mm in length was manufactured.

Examples 2-16 and Comparative Examples 1-11

Honeycomb structures were manufactured in the same manner as in Example 1, except that the combination of the porous ceramic member and the adhesive paste (including the coat forming paste) was changed as shown in Table 3.

TABLE 3

| | Porous Ceramic Member | Adhesive Paste | Pushing Strength (×10⁴ N) | Collecting Efficiency (%) |
|---|---|---|---|---|
| Ex. 1 | A | B | 1.49 | 87 |
| Ex. 2 | A | C | 1.85 | 86 |
| Ex. 3 | A | D | 1.63 | 87 |
| Ex. 4 | B | E | 1.68 | 91 |
| Ex. 5 | C | B | 1.58 | 84 |
| Ex. 6 | D | B | 1.56 | 95 |
| Ex. 7 | D | C | 1.80 | 93 |

TABLE 3-continued

| | Porous Ceramic Member | Adhesive Paste | Pushing Strength (×10⁴ N) | Collecting Efficiency (%) |
|---|---|---|---|---|
| Ex. 8 | D | F | 1.59 | 94 |
| Ex. 9 | E | G | 1.53 | 87 |
| Ex. 10 | F | B | 1.61 | 98 |

TABLE 3-continued

| | Porous Ceramic Member | Adhesive Paste | Pushing Strength (×10⁴ N) | Collecting Efficiency (%) |
|---|---|---|---|---|
| Ex. 11 | F | D | 1.76 | 97 |
| Ex. 12 | F | H | 1.56 | 98 |
| Ex. 13 | G | B | 1.53 | 88 |
| Ex. 14 | G | C | 1.69 | 88 |
| Ex. 15 | H | C | 1.62 | 92 |
| Ex. 16 | H | E | 1.67 | 91 |
| Com. Ex. 1 | A | A | 0.44 | 68 |
| Com. Ex. 2 | A | E | 0.35 | 71 |
| Com. Ex. 3 | B | F | 0.49 | 70 |
| Com. Ex. 4 | C | A | 0.45 | 67 |
| Com. Ex. 5 | D | A | 0.40 | 73 |
| Com. Ex. 6 | D | G | 0.31 | 72 |
| Com. Ex. 7 | E | H | 0.30 | 72 |
| Com. Ex. 8 | F | A | 0.47 | 76 |
| Com. Ex. 9 | F | I | 0.28 | 75 |
| Com. Ex. 10 | G | A | 0.27 | 68 |
| Com. Ex. 11 | H | F | 0.35 | 70 |

(Evaluation)

(1) Measurement of Porosity

A distribution of pores having pore sizes in a range of from 0.1 μm to 360 μm was measured in a mercury intrusion method using a porosimeter (Autopore III 9420 made by Shimadzu Corp.) based on a mercury intrusion method.

Porosities and average pore sizes of the porous ceramic members are shown in Table 1.

(2) Measurement of Pushing (Punching) Strength

Each honeycomb structure was heated to 800° C. in an oven, and then rapidly cooled down to the room temperature (cooled down to the room temperature by natural standing)

After that, the pushing (punching) strength was measured in the following method. The result is shown in Table 3.

In the measurement of the pushing (punching) strength, as shown in FIGS. 3A and 3B, the honeycomb structure 10 was mounted on a base 45, and a punching load (1 mm/min in pressing speed) was applied to a porous ceramic member in the center of the honeycomb structure 10 by an aluminum jig 40 having a diameter of 30 mm. Thus, the breaking strength (pushing strength) was measured. An Instron universal tester (5582 type) was used for measuring the strength.

(3) Measurement of Efficiency in Collecting Particulates

Figure 4:
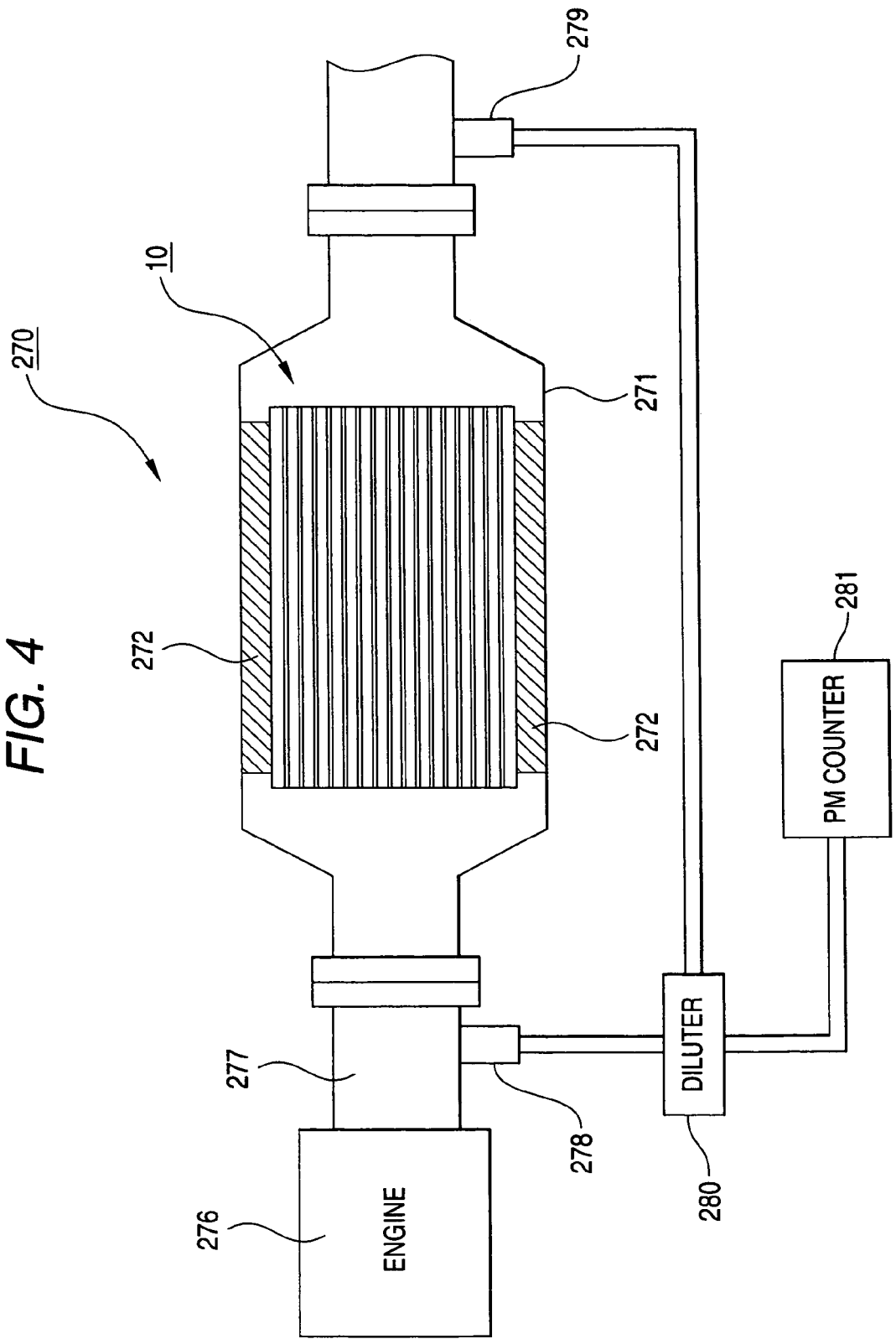
FIG. 4 is an explanatory view of a collecting efficiency measuring system.

The efficiency in collecting particulates was measured by use of a collecting efficiency measuring system 270 as shown in FIG. 4. FIG. 4 is an explanatory view of the collecting efficiency measuring system.

The collecting efficiency measuring system 270 was arranged as a scanning mobility particle sizer (SMPS) having a 2L common-rail type diesel engine 276, an exhaust gas pipe 277 allowing exhaust gas to flow from the engine 276, a metal casing 271 connected to the exhaust gas pipe 277 and fixing the honeycomb structure 10 wrapped in an alumina mat 272, a sampler 278 sampling the exhaust gas which had not yet flowed into the honeycomb structure 10, a sampler 279 sampling the exhaust gas which had flowed through the honeycomb structure 10, a diluter 280 diluting the exhaust gas sampled by each sampler 278, 279, and a PM counter 281 (condensation particle counter 3022A-S made by TSI Incorporated) measuring the amount of particulates included in the diluted exhaust gas. Here, the honeycomb structure 10 heated to 800° C. and then rapidly cooled down to the room temperature was used, similarly to the sample used for measuring the pushing (punching) strength in the aforementioned measurement (2).

Next, the procedure of measurement will be described. The engine 276 was operated so that the engine speed reached 2,000 min$^{-1}$ and the torque reached 47 Nm. Thus, the exhaust gas from the engine 276 was put into the honeycomb structure 10. In this event, a PM amount $P_0$ of the exhaust gas which had not yet flowed into the honeycomb structure 10 and a PM amount $P_1$ of the exhaust gas which had flowed through the honeycomb structure 10 were grasped from the numbers of PM particulates measured by the PM counter 281. The efficiency in collecting particulates was calculated using the following expression (3).

$$\text{Collecting Efficiency (\%)} = (P_0 - P_1)/P_0 \times 100 \tag{3}$$

The result is shown in Table 3.

As shown in Table 3, in the honeycomb structures of Examples satisfying the relation of the aforementioned expression (1) between the apparent density of the porous ceramic members and the Young's modulus of the adhesive layer, the pushing (punching) strength and the collecting efficiency were high even after a thermal shock was applied thereto. It can be considered that this is because there did not occur any fatal failure such as a crack in the porous ceramic members and the adhesive layer.

On the other hand, in the honeycomb structures of Comparative Examples, the pushing (punching) strength was not higher than ⅓ of that of any honeycomb structure of Examples. Further, the collecting efficiency was not higher than 80% of that of any honeycomb structure of Examples. It can be considered that this is because there occurred a failure such as a crack in the honeycomb structure and/or the adhesive layer at the time of heat treatment.

Figure 5:
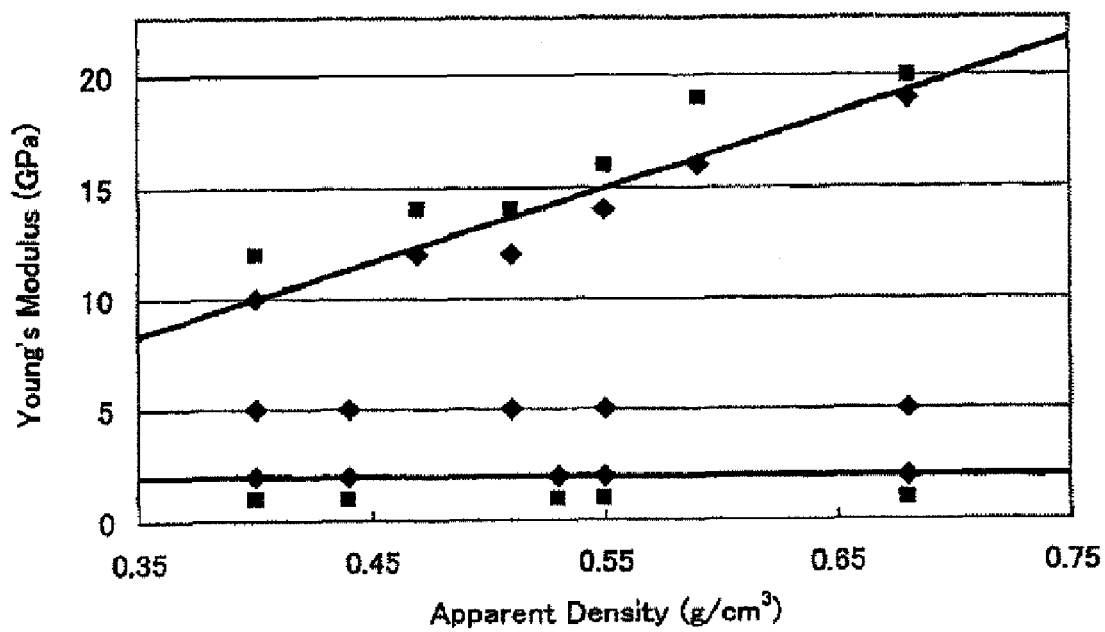
FIG. 5 is a graph in which examples 1-16 and comparative examples 1-11 are plotted on the basis of tables 1-3.

FIG. 5 shows a graph in which the examples 1 to 16 and the comparative examples 1 to 11 are plotted on the basis of the tables 1 to 3. The abscissa axis represents apparent density A (g/cm$^3$) of the porous cell member, and the ordinate axis represents Young's modulus B (GPa) of the adhesive layer. In the FIG. 5, diamond marks indicate respective examples 1 to 16; square marks indicate respective comparative examples 1 to 11; a lower straight line corresponds to the expression B=2; and an upper straight line corresponds to B=100/3×A−10/3. From FIG. 5, we can see that all the examples 1 to 16 satisfy the relationship (1) (that is, all the plotted examples 1 to 16 are between the upper and lower straight lines) and that all the comparative examples 1 to 11 don't satisfy the relationship (1).

The foregoing description of preferred embodiments of the invention has been presented for purposes of illustration and description only. It is not intended to be exhaustive or to limit the invention to the precise form disclosed, and modifications and variations are possible and/or would be apparent in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto and that the claims encompass all embodiments of the invention, including the disclosed embodiments and their equivalents.

What is claimed is:

1. A honeycomb structure, comprising:
a plurality of porous ceramic members;
an adhesive layer bonding at least two porous ceramic members to each other;
wherein each of the porous ceramic members comprises a plurality of cells;
wherein the cells extend in a longitudinal direction along the length of the honeycomb structure, are arranged in parallel and are separated from one another by cell walls;
and wherein the honeycomb structure satisfies the following relationship;

$$2 \leq B \leq 100/3 \times A - 10/3 \tag{1}$$

where A (g/cm$^3$) designates apparent density of the porous ceramic members, and B (SPa) designates Young's modulus of the adhesive layer.

2. The honeycomb structure according to claim 1, wherein the apparent density A is in a range of about 0.4 to about 0.7 g/cm$^3$.

3. The honeycomb structure according to claim 1, wherein the apparent density A is in a range of about 0.4 to about 0.6 g/cm$^3$.

4. The honeycomb structure according to claim 1, wherein a catalyst is carried and supported in at least a part of the cell walls.

5. The honeycomb structure according to claim 1, wherein the honeycomb structure comprises at least one porous ceramic selected from the group consisting of aluminum nitride, silicon nitride, boron nitride titanium nitride, silicon carbide, zirconium carbide, titanium carbide, tantalum carbide, tungsten carbide, alumina, zirconia, cordierite, mullite, silica, and aluminum titanate, and a complex of silicon and silicon carbide.

6. The honeycomb structure according to claim 1, wherein the honeycomb structure comprises pores having an average pore size of about 1 to about 100 μm.

7. The honeycomb structure according to claim 1, wherein the honeycomb structure comprises a porosity of about 20 to about 80%.

8. The honeycomb structure according to claim 1, wherein the honeycomb structure comprises a cell wall thickness of about 0.1 to about 0.5 mm.

9. The honeycomb structure according to claim 1, wherein the honeycomb structure comprises a cell wall thickness of about 0.1 to about 0.35 mm.

10. The honeycomb structure according to claim 1, wherein at least one cell comprises a plug and wherein the plug and the cell wall are made of the same porous ceramic material.

11. The honeycomb structure according to claim 1, wherein the adhesive layer comprises an inorganic binder, an organic binder, inorganic fibers and/or inorganic particles.

12. The honeycomb structure according to claim 1, wherein the honeycomb structure comprises a coating layer formed on an outer circumferential surface.

13. The honeycomb structure according to claim 1, wherein a catalyst is applied to at least a part of the cell walls in the honeycomb structure after the honeycomb structure satisfying the relationship (1) had been achieved.

14. The honeycomb structure according to claim 13, wherein the catalyst comprises at least one of platinum, palladium, and rhodium.

15. The honeycomb structure according to claim 13, wherein the catalyst further comprises at least one of an alkali metal, an alkaline earth metal, a rare-earth element, and a transition metal element.

16. A filter comprising a honeycomb structure according to claim 1.

17. An exhaust gas system comprising a filter according to claim 16.

18. A motor vehicle comprising a filter according to claim 16.

19. A motor vehicle according to claim 18, wherein the motor vehicle comprises a bus or a truck.

20. A construction machine comprising a filter according to claim 16.

21. A method of making a honeycomb structure according to claim 1, comprising:
   forming a raw material paste comprising a binder, a dispersion medium, and a ceramic powder;
   mixing the raw material paste;
   extruding the raw material paste;
   molding the paste to form a molded ceramic body;
   drying the molded ceramic body to form a first porous ceramic member comprising a plurality of cells which each comprise cell walls;
   plugging an end portion of at least some cells with a plug paste;
   firing the first porous ceramic member;
   applying adhesive paste to at least a side surface of the first porous ceramic member and laminating at least a second porous ceramic member to the first porous ceramic member;
   heating the first porous ceramic member, the paste and the second fired porous ceramic dried body to produce the honeycomb structure.

22. A method according to claim 21, further comprising, cutting the honeycomb structure to produce a ceramic block.

23. A method according to claim 22, further comprising applying a coating layer to an outer circumferential surface of the ceramic block.

24. A method according to claim 21, further comprising applying a catalyst support to at least a portion of a cell wall after the honeycomb structure satisfying the relationship (1) has been achieved.

25. A method according to claim 24, further comprising applying a catalyst on at least a portion of the catalyst support after the honeycomb structure satisfying the relationship (1) has been achieved.

* * * * *